(12) United States Patent
Hino

(10) Patent No.: US 11,300,539 B2
(45) Date of Patent: Apr. 12, 2022

(54) GAS SENSOR

(71) Applicant: DENSO CORPORATION, Kariya (JP)

(72) Inventor: Satoshi Hino, Kariya (JP)

(73) Assignee: DENSO CORPORATION, Kariya (JP)

( * ) Notice: Subject to any disclaimer, the term of this patent is extended or adjusted under 35 U.S.C. 154(b) by 120 days.

(21) Appl. No.: 16/321,915

(22) PCT Filed: Jul. 26, 2017

(86) PCT No.: PCT/JP2017/027100
§ 371 (c)(1),
(2) Date: Jan. 30, 2019

(87) PCT Pub. No.: WO2018/025724
PCT Pub. Date: Feb. 8, 2018

(65) Prior Publication Data
US 2019/0178835 A1 Jun. 13, 2019

(30) Foreign Application Priority Data
Aug. 1, 2016 (JP) .............................. JP2016-151368

(51) Int. Cl.
*G01N 27/409* (2006.01)
*G01N 27/407* (2006.01)
*F01N 11/00* (2006.01)

(52) U.S. Cl.
CPC ....... *G01N 27/409* (2013.01); *G01N 27/4071* (2013.01); *F01N 11/007* (2013.01)

(58) Field of Classification Search
CPC . G01N 27/409; G01N 27/4071; F01N 11/007
See application file for complete search history.

(56) References Cited

U.S. PATENT DOCUMENTS

2001/0025522 A1 10/2001 Kojima
2010/0139364 A1 6/2010 Kume et al.
(Continued)

FOREIGN PATENT DOCUMENTS

JP 2007-057370 3/2007
JP 2009-047574 3/2009
(Continued)

OTHER PUBLICATIONS

English translation for JP-2013181769, see attached document. (Year: 2013).*
(Continued)

*Primary Examiner* — Xin Y Zhong
(74) *Attorney, Agent, or Firm* — Nixon & Vanderhye P.C.

(57) ABSTRACT

A gas sensor stabilizes a contact state between a sensor element and each spring terminal is provided. A gas sensor includes a sensor element, a plurality of contact springs and an insulator. The insulator has an element insertion hole into which the sensor element is inserted, and a pair of spring guide grooves for guiding the pair of contact springs respectively. Each of the spring contact portions has a spring contact portion, whereby the spring contact portions are disposed at mutually-opposed positions with the sensor element located therebetween. The pair of spring guide grooves are formed at the mutually-opposed positions. The insulator is formed with a flex guide groove extending in a direction orthogonal to the direction in which the spring guide groove is formed. The flex guide groove communicates with the pair of spring guide grooves, and collectively guides the extension portions of the pair of spring contact portions.

21 Claims, 9 Drawing Sheets

(56) References Cited

U.S. PATENT DOCUMENTS

2010/0139379 A1     6/2010   Kume et al.
2013/0305811 A1    11/2013   Noda et al.

FOREIGN PATENT DOCUMENTS

| JP | 2009-047574 | A | † | 3/2009 |
| JP | 2009047574 | A | * | 3/2009 |
| JP | 2012-225741 | | | 11/2012 |
| JP | 2013-181769 | | | 9/2013 |
| JP | 2013-181769 | A | † | 9/2013 |
| JP | 2013181769 | A | * | 9/2013 |
| JP | 2015-145831 | | | 8/2015 |

OTHER PUBLICATIONS

English translation for JP-2009047574, see attached document. (Year: 2009).*

\* cited by examiner
† cited by third party

GAS SENSOR

CROSS REFERENCE TO RELATED APPLICATIONS

This application is the U.S. National Phase Application under U.S.C. 371 of the International PCT Application PCT/JP2017/027100, filed on Jul. 26, 2017, and published as WO/2018/025724 on Feb. 8, 2018. This application is based on and claims the benefit of priority from Japanese Application No. 2016-151368 filed Aug. 1, 2016, the contents of each of which are incorporated herein by reference.

TECHNICAL FIELD

The present disclosure relates to a gas sensor including a plurality of connection springs and an insulator.

BACKGROUND

Background Art

A gas sensor used for measuring the concentration of a specific gas component such as oxygen, NOx (nitrogen oxide), or the like in an exhaust gas flowing through an exhaust pipe of an internal combustion engine is disclosed in, for example, PTL 1. In PTL 1, each of a plurality of spring terminals which are in contact with the sensor element is held in a respective one of a plurality of holding grooves provided in the base-end side insulator. Each of the plurality of spring terminals is provided with a body portion disposed at the bottom portion of the holding groove and an extension portion folded back from the body portion and in contact with the sensor element in an elastically deformed state. An accommodation hole for inserting the sensor element in the axial direction of the gas sensor is formed in the base-end side insulator. The extension portion of each spring terminal is in contact with the sensor element inserted into the accommodation hole. The holding groove is formed to be parallel with the forming direction of the accommodation hole.

In PTL 1, after each of the spring terminals is held in each holding groove of the base-end side insulator, and before the sensor element is inserted into the accommodation hole of the base-end side insulator, the nearest-neighboring unit located at the tip end of the extension portion of each spring terminal is disposed in each holding groove. According to this configuration, when the sensor element is inserted into the accommodation hole, prevention measures has been implemented so that each sensor element does not fall on the extension portions of each spring terminal and cause a problem such as twisting or the like.

CITATION LIST

Patent Literature

PTL 1: JP 2015-145831 A

In the gas sensor of PTL 1, the depth direction perpendicular to the forming direction of the holding groove is parallel with the direction in which the body portion and the extension portion of the spring terminal face each other. In this configuration, when the extension portion is elastically deformed and flexed with respect to the body portion, the nearest-neighboring unit of the extension portion is displaced mainly in the depth direction of the holding groove. Specifically, the extension portion has a base-end portion which serves as a starting point when the extension portion is flexed. Hence, during such a flexing operation, the nearest-neighboring unit of the extension portion is displaced only slightly in the forming direction of the holding groove, while being greatly displaced in the depth direction of the holding groove. Therefore, in the state in which the sensor element is not inserted yet into the accommodation hole of the base-end side insulator, when an external force is unexpectedly applied to the extension portion of the spring terminal, the extension portions may likely pass each other in the width direction orthogonal to both the forming direction of the holding groove and the depth direction of the holding groove. In some cases, the nearest-neighboring unit of the extension portion may be displaced from the holding groove.

When this misalignment problem occurs in the nearest-neighboring unit of the extended portion of the spring terminal, the posture of the extended portion pushed by the sensor element is disturbed when the sensor element is inserted into the accommodation hole of the base-end side insulator, and the extended portion cannot be stably flexed. As a result, the contact state between the sensor element and each of the extension portions tends to vary.

SUMMARY

The present disclosure provides a gas sensor that is able to stabilize a contact state between a sensor element and the respective spring terminals.

An embodiment of the present disclosure provides a gas sensor including: a gas sensor comprising: a pair of contact springs, each of the paired contact springs having a spring body portion and a spring contact portion which extends from an end portion of the spring body portion, and faces the spring body portion, and is allowed to be flexed to come in contact with a sensor element, for measuring a concentration of gas; an insulator having an element insertion hole into which the sensor element is inserted and a pair of spring guide grooves communicating with the element insertion hole, are formed along a forming direction of the element insertion hole, and guides and holds the spring main body of the pair of contact springs, respectively, wherein; the spring contact portions of the pair of the contact springs are disposed at positions which are opposed with each other with the sensor element interposed therebetween; the pair of spring guide grooves are disposed at positions opposed to each other with the element insertion hole interposed therebetween; and the insulator of the gas sensor has a flex guide groove formed in a direction orthogonal to a direction in which the pair of spring guide grooves, which are opposed to each other, extend.

Advantageous Effects of Invention

The insulator of the gas sensor has a flex guide groove formed in a direction orthogonal to a direction in which a pair of spring guide grooves which are opposed to each other are formed. The flex guide groove guides a portion of the spring contact portion which is different from the portion guided by the spring guide groove.

In the state in which the sensor element is not inserted into the element insertion hole of the insulator, when the spring contact portion is flexed from the end portion, which serves as a starting point, connected to the spring body portion, the tip-end portion of the spring contact portion is greatly displaced in the forming direction of the flex guide groove, while being displaced only slightly in the depth direction of the flex guide groove. Therefore, in this state, even when an external force is unintentionally applied to the spring contact portion of the contact spring, it is possible to prevent the tip-end portion of the spring contact portion from being displaced from the flex guide groove. Further, since the spring contact portions of the contact spring are guided by the spring guide groove and the flex guide groove, the spring contact portions can be prevented from being displaced in the width direction orthogonal to the extending direction of the flex guide groove and the depth direction of the flex guide groove and passing in the width direction.

When the sensor element is inserted into the element insertion hole of the insulator, each of the spring contact portions of the pairs of contact springs are guided by the spring guide groove, and the spring contact portion of each contact spring is guided by the flex guide groove. When the spring contact portions of each contact spring is flexed by being pushed by the sensor element, in particular, the posture of each of the spring contact portions is stabilized through the guiding of each of the spring contact portions by the flex guide groove, and each of the spring contact portions can be stably flexed. As a result, the contact state between the sensor element and each spring contact portion can be stabilized.

As described above, in the aforementioned gas sensor, the contact state of the sensor element and the each of the spring contact portions of the pairs of contact springs can be stabilized.

The flex guide groove may be formed in the state in which the insulator cannot be penetrated, or may be formed as a hole in the state in which the insulator can be penetrated. Reference signs in parentheses for components shown in an aspect of the present disclosure indicate a correspondence relationship with reference signs in the drawings for embodiments, but components are not limited to only the contents of the embodiments.

BRIEF DESCRIPTION OF THE DRAWINGS

The objects, features, advantages and the like of the present disclosure will become clearer from the following detailed description referring to the accompanying drawings. The drawings of the present disclosure will be shown below.

DESCRIPTION OF THE EMBODIMENTS

The following describes embodiments of the aforementioned gas sensor with reference to FIGS. 1 to 7.

First Embodiment

Figure 1:
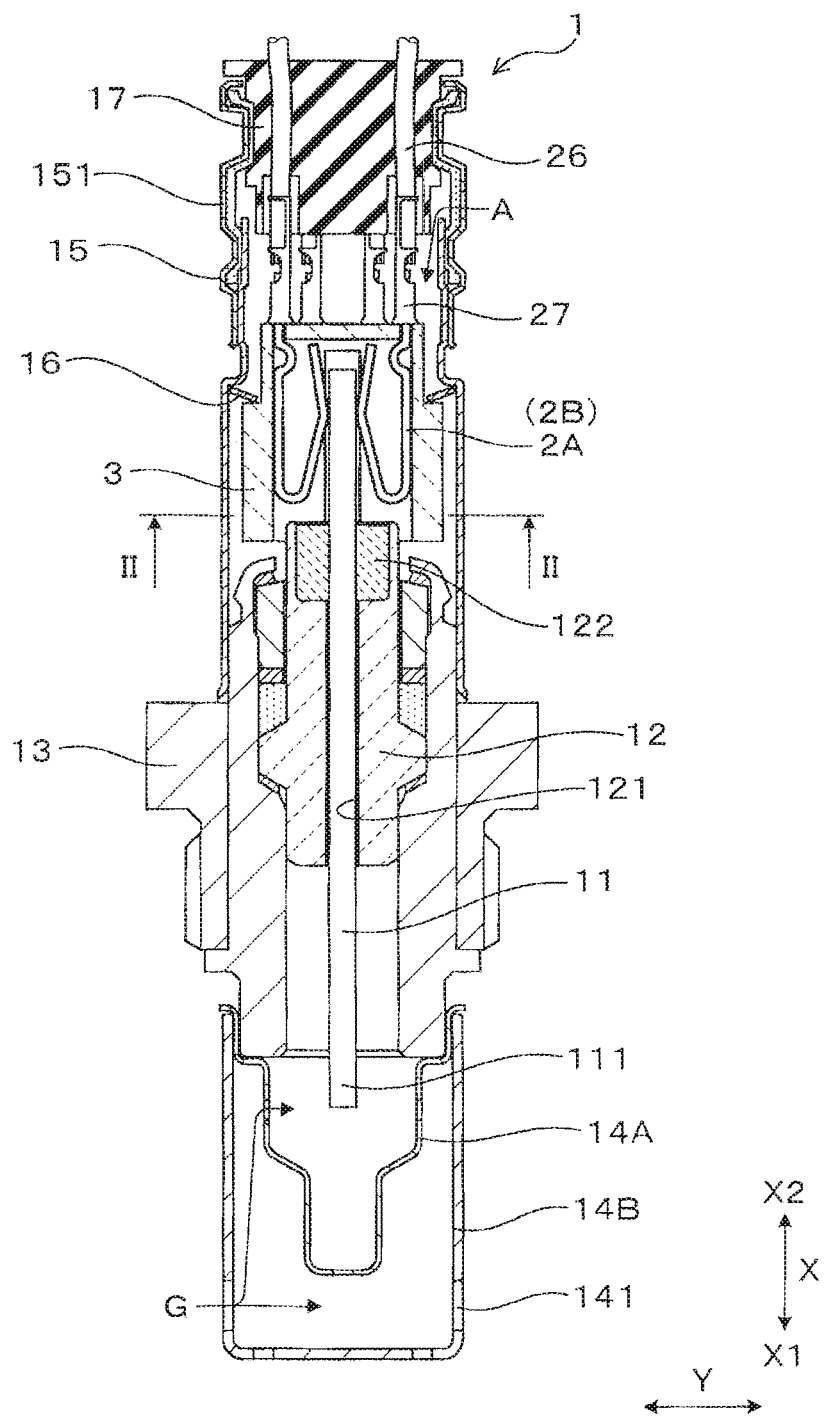
FIG. 1 is a cross-sectional view of a gas sensor according to a first embodiment.
Figure 2:
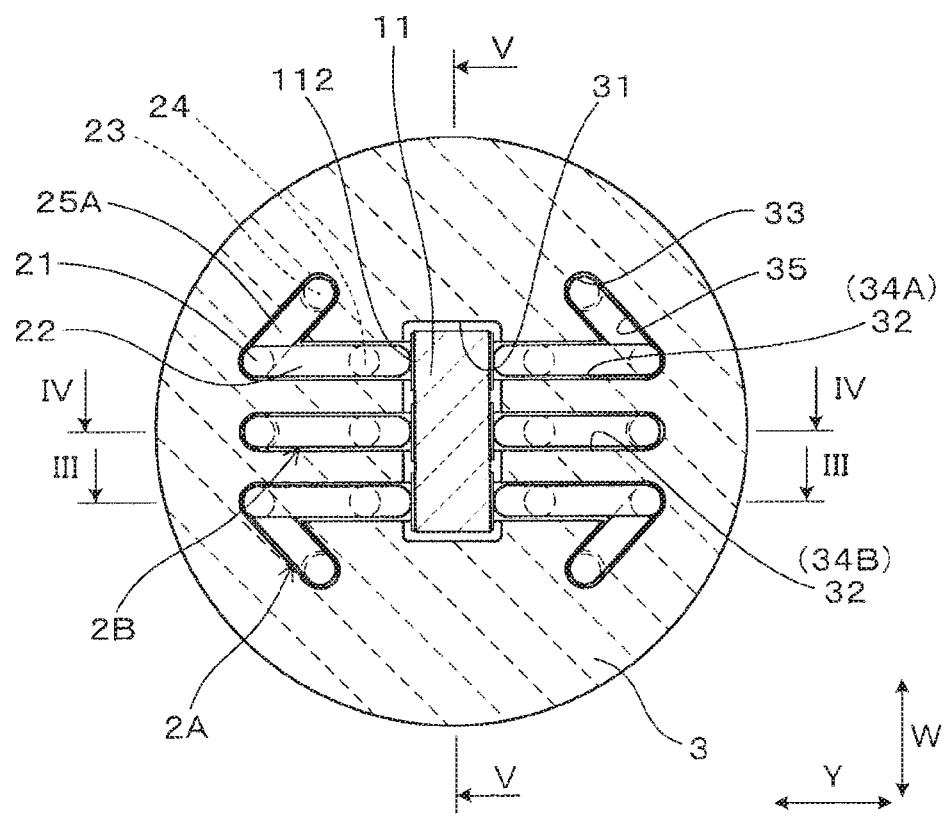
FIG. 2 is a cross-sectional view taken along line II-II of FIG. 1 according to the first embodiment.
Figure 3:
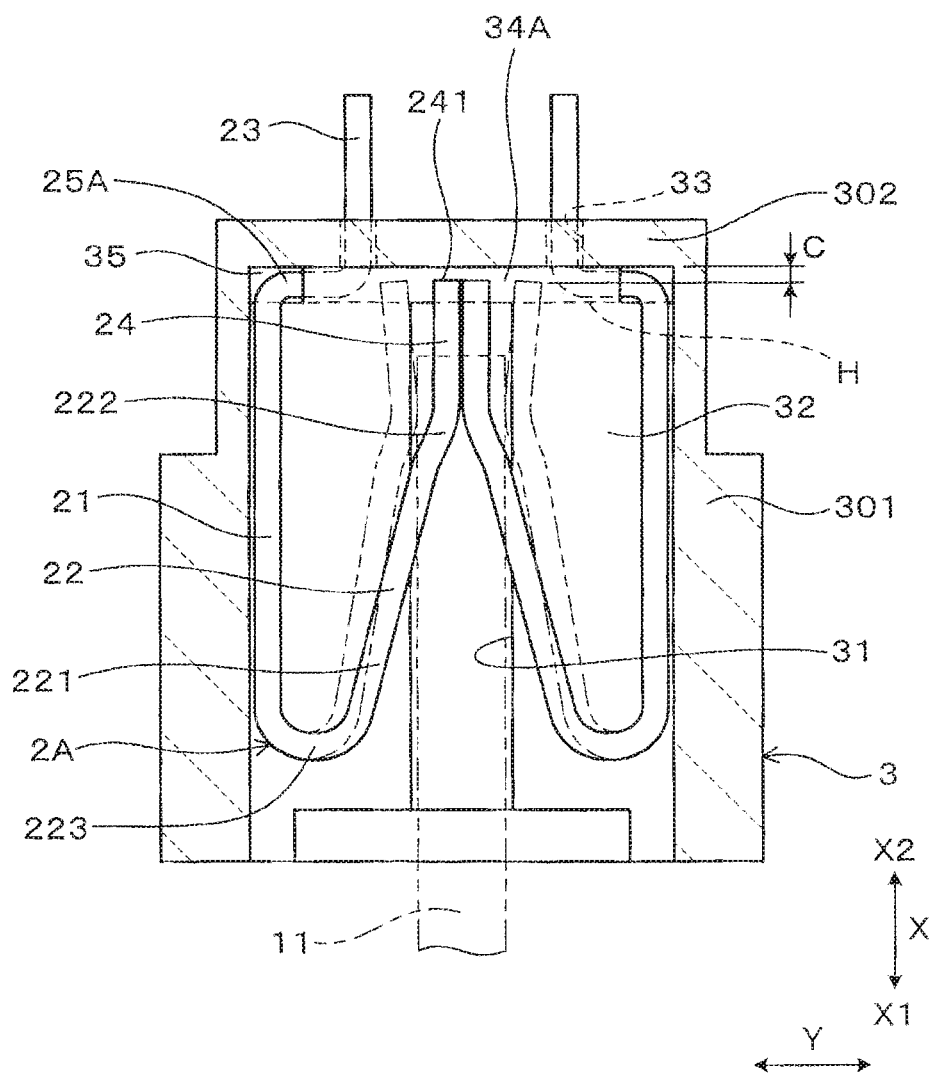
FIG. 3 is a cross-sectional view taken along line III-III of FIG. 2, showing a state before the sensor element is inserted into the element insertion hole of the insulator according to the first embodiment.
Figure 4:
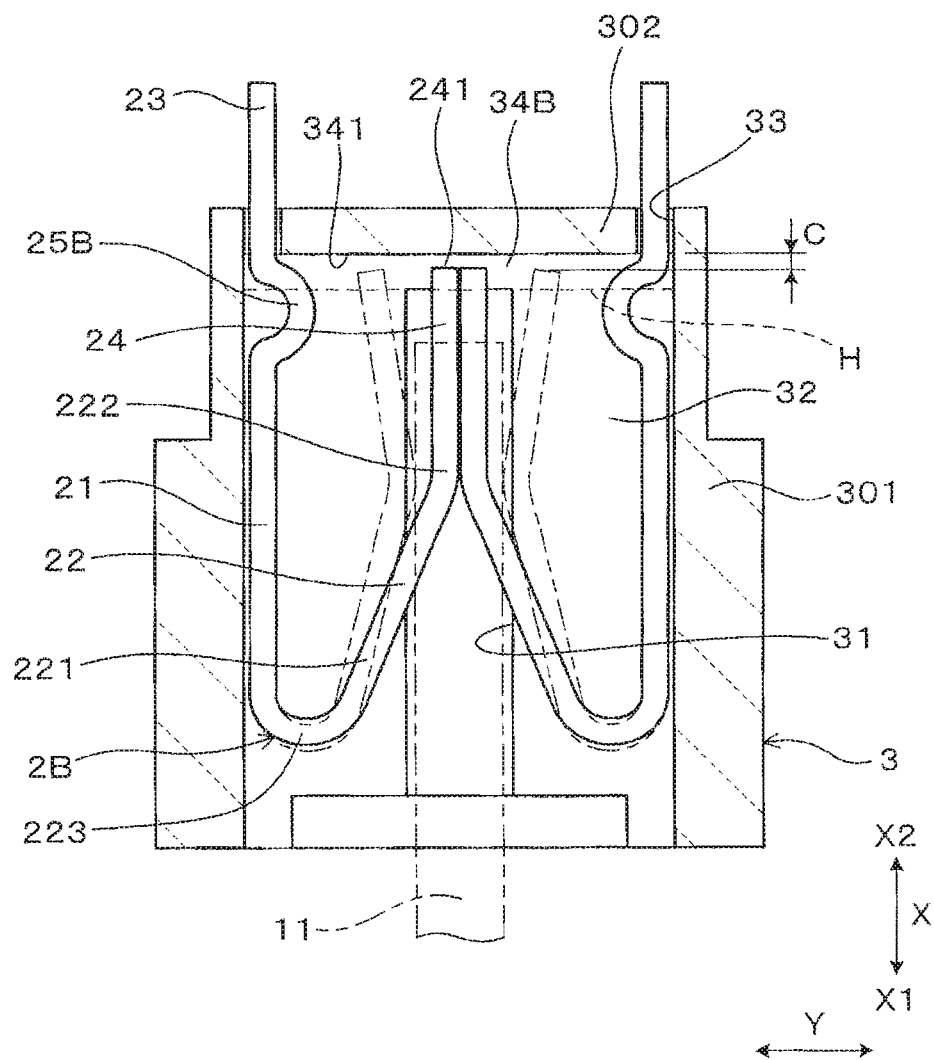
FIG. 4 is a cross-sectional view taken along line IV-IV of FIG. 2, showing a state before the sensor element is inserted into the element insertion hole of the insulator according to the first embodiment.

As shown in FIG. 1, the gas sensor 1 of the present embodiment includes a sensor element 11 for measuring a gas concentration, a pair of contact springs 2A, 2B, and 2A in contact with the sensor element 11, and an insulator 3 for holding the contact springs 2A, 2B, and 2A. As shown in FIGS. 2 to 4, each of the contact springs 2A, 2B, and 2A are respectively provided with a spring body portion 21 and a spring contact portion 22. The spring contact portion 22 extends from the end portion of the spring body portion 21, faces the spring body portion 21, and comes in contact with the sensor element 11 while being flexed. FIGS. 3 and 4 show a pair of contact springs 2A, 2B, and 2A and an insulator 3. In the drawings, the sensor element 11 inserted into the element insertion hole 31 of the insulator 3 and each of the pair of contact springs 2A and the pair of contact springs 2B that are flexed (elastically deformed) when the sensor element 1 is inserted are indicated by two-dot chain lines.

The insulator 3 has the element insertion hole 31 into which the sensor element 11 is inserted, a pair of spring guide grooves 32 for guiding and holding the spring main body 21 of the pair of contact springs 2A, 2B, and 2A, respectively, and a pair of spring insertion holes 33 through which the spring extension portions 23 extending from the spring main body 21 of the pair of contact springs 2A, 2B, and 2A, respectively, are inserted. The spring guide groove 32 communicates with the element insertion hole 31 and is formed along the forming direction of the element insertion hole 31.

As shown in FIGS. 2 to 4, each of the spring contact portions 22 of the pairs of contact springs 2A and each of the spring contact portions 22 of the pair of contact springs 2B are disposed at positions which are opposed to each other with the sensor element 11 interposed therebetween. The pair of spring guide grooves 32 are formed at positions which are opposed to each other with the element insertion hole 31 interposed therebetween. The flex guide grooves 34A, 34B, and 34A extending in a direction orthogonal to the direction in which the spring guide groove 32 is formed are formed in the insulator 3. The flex guide grooves 34A, 34B, and 34A restrict flexion in the same direction as the spring flexion direction in which the extension portions 24 of the pair of spring contact portions 22 which are opposed to each other are restrained by the pair of spring guide grooves 32 which are opposed to each other by the grooves or through-grooves formed in the bottom surface 341.

Figure 5:
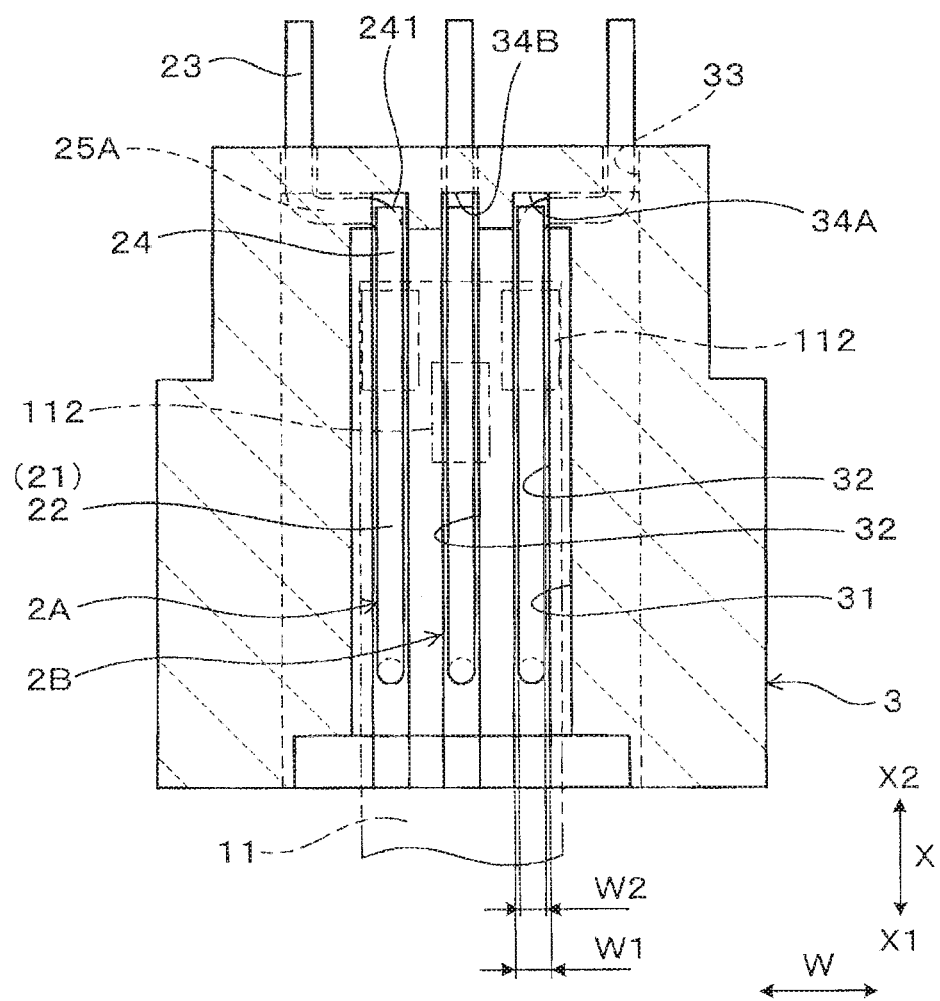
FIG. 5 is a cross-sectional view taken along line V-V of FIG. 2, which indicates the status before the sensor element is inserted into the element insertion hole of the insulator according to the first embodiment.

As shown in FIG. 5, the width W1 of the flex guide grooves 34A, 34B, and 34A is more than 1-fold to less than 2-fold re width (diameter) W2 of the extension portion 24 of the spring contact portion 22 disposed in the flex guide grooves 34A, 34B, and 34A. Here, the "width W1 of the flex guide grooves 34A, 34B, and 34A" refers to the width in the width direction orthogonal to the forming direction and the depth direction of the flex guide grooves 34A, 34B, and 34A, and the "width of the extension portion 24 of the spring contact portion 22" refers to the width along the width direction of the flex guide grooves 34A, 34B, and 34A. FIG. 5 shows a plurality of contact springs 2A, 2B, and 2A and an insulator 3.

The gas sensor 1 of the present embodiment will now be described in detail.

(Gas Sensor 1)

As shown in FIG. 1, the gas sensor 1 of the present embodiment is disposed in an exhaust pipe or the like of an internal combustion engine of a vehicle, and is used to measure the concentration of oxygen, the concentration of a specific gas component such as NOx (nitrogen oxide), and the like in the exhaust gas G flowing through the exhaust pipe or the like. The gas sensor 1 may be used for measuring an air-fuel ratio of an internal combustion engine.

As shown in FIGS. 1 and 2, the gas sensor 1 of the present embodiment refers to a direction in which the sensor element 11 is inserted into the element insertion hole 31 as an insertion direction X. In addition, the open side of the element insertion hole 31 is referred to as a tip-end side X1 in the insertion direction X, and the side opposite to the tip-end side X1 is referred to as a base-end side X2. The tip-end side X1 is a side on which the sensor element 11 is exposed to the exhaust gas G. The direction in which the spring contact portion 22 comes in contact with the sensor element 11 orthogonal to the insertion direction X is referred to as a contact direction Y, and the direction orthogonal to the insertion direction X and the contact direction Y is referred to as a width direction W.

The forming direction of the spring guide groove 32 and the depth direction of the flex guide grooves 34A, 34B, and 34A are the same direction, and are parallel to the insertion direction X. The depth direction of the spring guide groove 32 and the forming direction of the flex guide grooves 34A, 34B, and 34A are the same direction, and are perpendicular to the insertion direction X and parallel to the contact direction Y.

As shown in FIG. 1, in addition to the sensor element 11, the contact springs 2A, 2B, and 2A, and the insulator 3, the gas sensor 1 includes a housing 13 for attaching the gas sensor 1 to an exhaust pipe or the like of an internal combustion engine, a supporter 12 for fixing the sensor element 11 to the housing 13, tip-end side covers 14A and 14B attached to the tip-end side X1 of the housing 13, a base-end side cover 15 attached to the base-end side X2 of the housing 13, and the like.

An insertion hole 121 through which the sensor element 11 is inserted is formed in the center shaft portion of the supporter 12. The sensor element 11 is inserted through the insertion hole 121 of the supporter 12, and is held by the supporter 12 by filling, with talc 122, the concave portion provided on the base-end side X2 of the insertion hole 121.

The tip-end side covers 14A and 14B are composed of an inside cover 14A covering the gas detection portion 111 for measuring the gas concentration, and an outside cover 14B covering the inside cover 14A, which are formed at the tip-end portion of the sensor element 11. The inside cover 14A and the outside cover 14B are formed with a circulation hole 141 through which the exhaust gas G flows.

The base-end side cover 15 covers the insulator 3, and the base-end side cover 15 is formed with a vent hole 151 for guiding the atmosphere A to the base-end portion of the sensor element 11. A leaf spring 16 for holding the insulator 3 in the base-end side cover 15 is disposed in the base-end side cover 15.

(Sensor Element 11)

As shown in FIG. 1, the gas detection portion 111 of the sensor element 11 protrudes to the tip-end side X1 of the supporter 12, and is covered with the tip-end side covers 14A and 14B. In the gas detection unit 111, four electrodes are dispersed and arranged on both main surfaces of a plate-like solid electrolyte body having conductivity. Some of the electrodes are disposed in an exhaust gas chamber into which the exhaust gas G is introduced, which is provided in contact with one main surface of the solid electrolyte body. In addition, some of the electrodes are disposed in an atmosphere chamber into which the atmosphere A is introduced, which is provided in contact with the other main surface of the solid electrolyte body. The exhaust gas chamber and the atmosphere chamber are formed by being surrounded by an insulator.

The sensor element 11 is formed in an elongated shape. The sensor element 11 includes a solid electrolyte body and a heater for heating a pair of electrodes. The heater is composed of a heating element which generates heat by energization and a ceramic substrate in which the heating element is embedded. The solid electrolyte, the insulator, and the heater substrate are laminated on each other.

As shown in FIG. 1, the base-end portion of the sensor element 11 protrudes to the base-end side X2 of the supporter 12. As shown in FIGS. 2 and 5, at the base-end portion of the sensor element 11, there are formed four electrodes and electrode terminal portions 112 connected to respective ends of the heating element, respectively. In the sensor element 11 of the present embodiment, three electrode terminal portions 112 are formed on mutually parallel surfaces. Three contact springs 2A, 2B, and 2A are disposed to be bridged on both sides of the sensor element 11 in the state of being held by the insulator 3.

As shown in FIG. 2, four first contact springs 2A and two second contact springs 2B are arranged in the insulator 3. Each of the spring contact portions 22 of the pairs of contact springs 2A and each of the spring contact portions 22 of the pair of contact springs 2B are in contact with the electrode terminal portions 112, respectively. Sensor element 11 is sandwiched between spring contact portions 22 of three pairs of contact springs which are two pairs of contact springs 2A and a pair of contact spring 2B which are opposed to each other in the state of being inserted into the element insertion hole 31 of the insulator 3.

(Contact springs 2A, 2B, and 2A) As shown in FIG. 1, each lead wire 26 is connected to the spring extension portion 23 of the spring body portion 21 in each of the pair of contact springs 2A and the pair of contact springs 2B via each connection terminal 27. The four electrodes of the sensor element 11 and respective ends of the heating element are connected to a control device disposed outside the gas sensor 1 via each of the pair of contact springs 2A and the pair of contact springs 2B, the connection terminals 27, and the lead wires 26. In addition, each lead wire 26 is held in the base-end side cover 15 by a bush 17 disposed in the base-end side cover 15.

As shown in FIGS. 2 and 5, the insulator 3 of the present embodiment holds three pairs of contact springs 2A, 2B, and 2A. The contact springs 2A, 2B, and 2A include a first contact spring 2A positioned on the outside of the contact springs 2A, 2B, and 2A arranged three by three in the width direction W on both sides of the contact direction Y of the sensor element 11, and a second contact spring 2B positioned between the first contact springs 2A on the outside. The insulator 3 holds two pairs of first contact springs 2A and a pair of second contact springs 2B. It should be noted that it is not necessary to constitute all of the contact springs by pairs, and the contact springs which do not form pairs may be included in the contact springs. The contact springs may be, for example, five in number in total having two pairs of contact springs and one contact spring.

Each of the pair of contact springs 2A and the pair of contact springs 2B is made of a heat-resistant spring material such as a Ni (nickel) alloy material in order to improve heat resistance. Examples of the heat-resistant spring material include Inconel® (registered trademark), which is a superalloy containing a nickel base. Each of the pair of contact springs 2A and the pair of contact springs 2B may be made of SUS materials (stainless-steel material).

As shown in FIGS. 2 to 4, spring bending portions 25A and 25B are formed between the spring body portion 21 and the spring extension portion 23 of each of the pair of contact springs 2A and the pair of contact springs 2B for relaxing the force acting on each of the pair of contact springs 2A and the pair of contact springs 2B from the lead wire 26 when caulking the bush 17 and the respective lead wires 26 in the base-end side cover 15, or when attaching the gas sensor 1 to an exhaust pipe or the like.

The spring bending portion 25A of the first contact spring 2A is bent in a direction orthogonal to the spring body portion 21, and is formed in a shape twisted around the central axis of the spring body portion 21. The bent portion 25B of the second contact spring 2B is formed to bulge in a U-shape formed in the contact direction Y. The spring body portion 21 of each of the pair of contact springs 2A and the pair of contact springs 2B is formed along the insertion direction X, and is disposed in the spring guide groove 32 of the insulator 3 formed along the insertion direction X.

As shown in FIGS. 3 and 4, each of the spring contact portions 22 of the pairs of contact springs 2A and each of the spring contact portions 22 of the pair of contact springs 2B are formed by being folded back from the end portion of the tip-end side X1 to the base-end side X2 of the spring body portion 21. The spring contact portion 22 includes a root portion 221 that is folded back from the spring body portion 21 and inclined so as to approach the sensor element 11 from the tip-end side X1 toward the base-end side X2, an extension portion 24 that connects the root portion 221 and is inclined so as to be away from the sensor element 11 as it is directed from the tip-end side X1 toward the base-end side X2, a contact portion 222 that is positioned between the root portion 221 and the extension portion 24 and is in contact with the electrode terminal portion 112 of the sensor element 11, and a connection portion 223 that connects the spring body 21 to the root portion 221.

The connection portion 223 bends in a curved shape in order to turn back the root portion 221 with respect to the spring body portion 21. When the spring contact portion 22 comes in contact with the sensor element 11, both of the connection portion 223 and the root portion 221 flex, namely elastically deform.

The root portion 221 is disposed in the spring guide groove 32 of the insulator 3.

The contact portion 222 is given a spring force (elastic deformation restoring force) due to the bending of the spring contact portion 22, and comes in contact with the electrode terminal portion 112 of the sensor element 11. The extension portion 24 is formed to extend linearly so as to be disposed in the flex guide grooves 34A, 34B, and 34A. The end surface 241 of the extension portion 24 is disposed in the flex guide grooves 34A, 34B, and 34A. The end surface 241 refers to a portion located at the most end of each of the pair of contact springs 2A and each of the pair of contact springs 2B which are formed by bending.

The spring extension portion 23 of each of the pair of contact springs 2A and the pair of contact springs 2B is connected to each of the spring body portions 21 via each of the spring bending portions 25A and 25B. Each spring extension portion 23 is formed along the insertion direction X in parallel with the spring body portion 21. The spring extension portion 23 is pulled out to the base-end side X2 of the insulator 3 in the state of being inserted into the spring insertion hole 33 of the insulator 3.

Each of the pair of contact springs 2A and the pair of contact springs 2B is formed by bending a spring wire material having a circular cross section in order to reduce the size and increase the number of contacts of the electrode terminal portion 112 of the sensor element 11. By forming each of the pair contact springs 2A and the pair of contact springs 2B from the spring wire material, bending in an arbitrary direction is facilitated.

Each of the pair of contact springs 2A and the pair of contact springs 2B may be formed of a plate material having a rectangular cross section, in addition to being formed of a spring wire material. When each of the pair of contact springs 2A and the pair of contact springs 2B is formed of a rectangular plate material, the aspect ratio in the cross section of the plate material can be set within a range of 1:1 to 1:2. In each of the pair of contact springs 2A and the pair of contact springs 2B made of a rectangular plate material, a side having a wide width in the cross section is arranged in the width direction W.

(Insulator 3)

Figure 6:
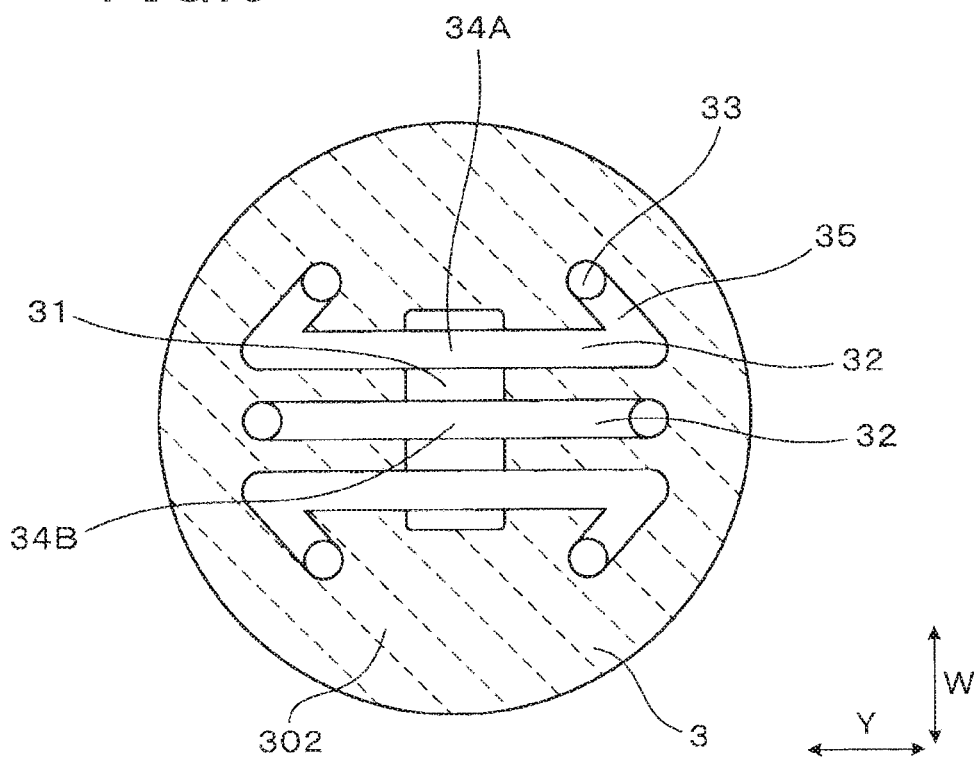
FIG. 6 is a cross-sectional view taken along line II-II of FIG. 1, which indicates the status before the contact spring and the sensor element are arranged in the insulator according to the first embodiment.

As shown in FIGS. 3, 4, and 6, in the insulator 3, the element insertion hole 31, the plurality of spring guide grooves 32, and the plurality of flex guide grooves 34A, 34B, and 34A are formed by concave portions that are concaved from the tip-end side X1 to the base-end side X2 in the insertion direction X of the insulator 3. By forming the element insertion hole 31, the plurality of spring guide grooves 32, and the plurality of flex guide grooves 34A, 34B, and 34A, an annular side wall portion 301 and a bottom wall portion 302 located on the base-end side of the side wall portion 301 are formed in the insulator 3.

(Element Insertion Hole 31 and Spring Guide Groove 32)

As shown in FIG. 6, the element insertion hole 31 is formed in the center portion of the insulator 3 along the insertion direction X. Six spring guide grooves 32 are formed in the insulator 3 in parallel with the insertion direction X. Three spring guide grooves 32 communicate with the element insertion hole 31 from both sides in the contact direction Y. Three flex guide grooves 34A, 34B, and 34A are formed in the insulator 3 in the state parallel to the contact direction Y. In the insulator 3, six spring insertion holes 33 are formed so as to communicate with each of the flex guide grooves 34A, 34B, and 34A and penetrate the bottom wall portion 302 in the insertion direction X.

(Flex Guide Grooves 34A, 34B, and 34A)

Figure 7:
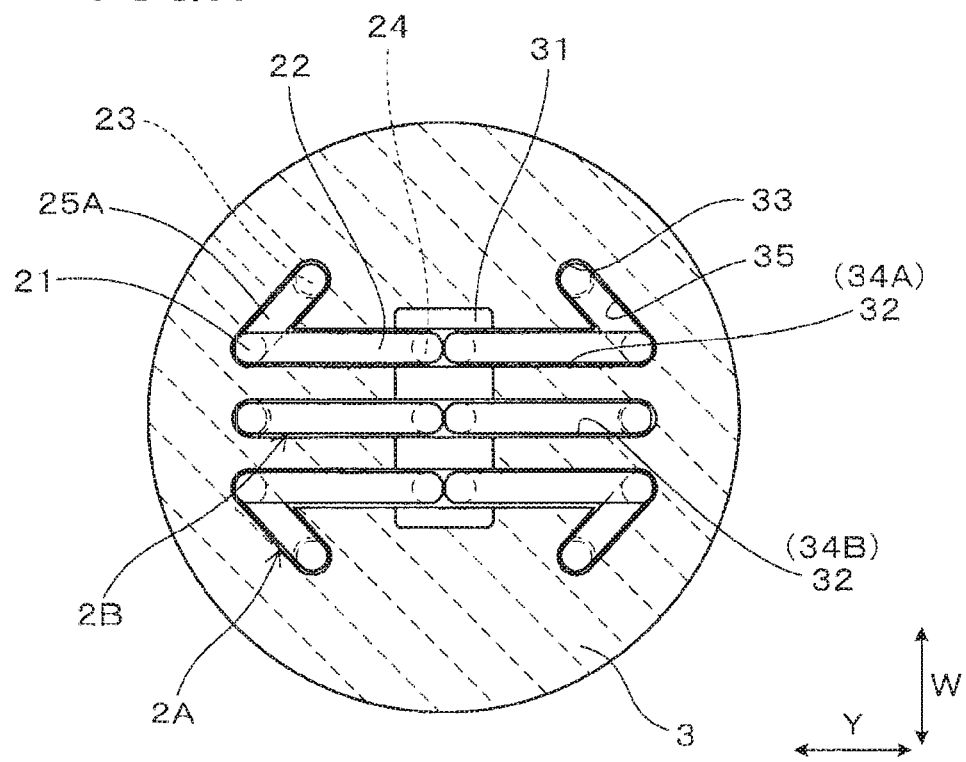
FIG. 7 is a cross-sectional view taken along line II-II of FIG. 1, which indicates the status before the sensor element is arranged in the element insertion hole of the insulator according to the first embodiment.

As shown in FIGS. 6 and 7, the flex guide grooves 34A, 34B, and 34A of the present embodiment are continuously formed in the contact direction Y so as to communicate with the spring guide grooves 32 located on both sides in the contact direction Y. Three flex guide grooves 34A, 34B, and 34A are formed so as to communicate with the three spring guide grooves 32 formed on both sides in the contact direction Y. In the two outer flex guide grooves 34A of the three flex guide grooves 34A, 34B, and 34A, there are arranged the extension portions 24 of the spring contact portions 22 of the pair of first contact springs 2A which are opposed to each other with the sensor element 11 interposed therebetween. In the middle flex guide groove 34B of the three flex guide grooves 34A, 34B, and 34A, there is arranged the extension portions 24 of the spring contact portions 22 of the pair of second contact springs 2B which are opposed to each other with the sensor element 11 interposed therebetween.

An inclined groove 35 in which the spring bending portion 25A of the first contact spring 2A is disposed communicates with respective ends of the two flex guide grooves 34A.

As shown in FIGS. 3 to 5, the width W1 of the flex guide grooves 34A, 34B, and 34A of the present embodiment in the width direction W is the same as the width of the spring guide groove 32 in the width direction W. The forming length and the forming location of the spring guide groove 32 in the insertion direction X are the same as the forming length and the forming location of the element insertion hole 31 in the insertion direction X. On the other hand, the flex guide grooves 34A, 34B, and 34A are formed at positions adjacent to the element insertion hole 31 and the spring guide groove 32 on the base-end side X2 in the insertion direction X. The flex guide grooves 34A, 34B, and 34A can be distinguished from the spring guide groove 32 by being also formed at positions adjacent to the base-end side X2 of the element insertion hole 31. In FIGS. 3 and 4, the boundary between the spring guide groove 32 and the flex guide grooves 34A, 34B, and 34A is indicated by a broken line H. The width W1 of the flex guide grooves 34A, 34B, and 34A in the width direction W may be different from the width W of the spring guide groove 32.

As shown in FIG. 3, the end surface 241 of the extension portion 24 of the spring contact portion 22 of the pair of first contact springs 2A which are opposed to each other with the sensor element 11 interposed therebetween is disposed in the flex guide groove 34A on the base-end side X2 of the sensor element 11. As shown in FIG. 4, the end surface 241 of the extension portion 24 of the spring contact portion 22 of the pair of second contact springs 2B which are opposed to each other with the sensor element 11 interposed therebetween is disposed in the flex guide groove 34B on the base-end side X2 of the sensor element 11.

In the state before the sensor element 11 is inserted into the element insertion hole 31 of the insulator 3, the end surface 241 of the extension portion 24 of each spring contact portion 22 is disposed at the center portion in the contact direction Y in the flex guide grooves 34A, 34B, and 34A located on the base-end side X2 of the element insertion hole 31. When the sensor element 11 is inserted into the element insertion hole 31, the end surface 241 of the extension portion 24 of each spring contact portion 22 pushed by the sensor element 11 slides outward in the contact direction Y in the flex guide grooves 34A, 34B, and 34A.

As shown in FIG. 5, the width W1 in the width direction W of each of the flex guide grooves 34A, 34B, and 34A is within the range of 1 to 1.5-fold, preferably 1.1 to 1.4-fold, of the width (diameter) W2 of the extension portion 24 of the spring contact portion 22 in each of the pair of contact springs 2A and the pair of contact springs 2B. In order for the extension portion 24 of the spring contact portion 22 to be disposed in the flex guide grooves 34A, 34B, and 34A, the width W1 needs to be more than 1-fold the width W2. In addition, in order that the extension portion 24 of the spring contact portion 22 does not overlap in the width direction W and is not disposed in the flex guide grooves 34A, 34B, and 34A, the width W1 needs to be smaller than 2-fold the width W2. By making the width W1 smaller than 1.5-fold the width W2, when the extension portion 24 of each spring contact portion 22 is guided by each of the flex guide grooves 34A, 34B, and 34A, it is possible to make the position of the extension portion 24 hardly vary in the width direction W.

As shown in FIGS. 3 and 4, a gap C is formed between the end surface 241 of the extension portion 24 of each of the spring contact portions 22 in each of the pair of contact springs 2A and each of the spring contact portions 22 in each of the pair of contact springs 2B and the bottom surface 341 of the flex guide grooves 34A, 34B, and 34A to avoid contact of the end surface 241 with the bottom surface 341. The size of the gap C is determined in relation to the depths of the flex guide grooves 34A, 34B, and 34A. The depth in the insertion direction X of the flex guide grooves 34A, 34B, and 34A is set to a depth at which the end surface 241 of the extension portion 24 does not contact the bottom surface 341 of the flex guide grooves 34A, 34B, and 34A and the end surface 241 of the extension portion 24 does not become displaced from the flex guide grooves 34A, 34B, and 34A when the extension portion 24 of the spring contact portion 22 slides in the flex guide grooves 34A, 34B, and 34A along the forming direction thereof. The size (depth) of the gap C is set to a size such that the end surface 241 of the extension portion 24 does not contact the bottom surface 341 of the flex guide grooves 34A, 34B, and 34A when the extension portion 24 of the spring contact portion 22 slides in the flex guide grooves 34A, 34B, and 34A along the forming direction thereof.

The insulator 3 in which the flex guide grooves 34A, 34B, and 34A of the present embodiment are formed exhibits an effect when the sensor element 11 is inserted into the insulator 3 in which each of the pair of contact springs 2A and the pair of contact springs 2B are arranged.

(Before Insertion of Sensor Element 11)

As shown in FIGS. 3, 4, and 7, when the gas sensor 1 is assembled, the four first contact springs 2A and the two second contact springs 2B are held by the insulator 3 and the sensor element 11 is not inserted into the element insertion hole 31 of the insulator 3, the contact portions 222 of the spring contact portions 22 of the pair of first contact springs 2A which are opposed to each other and the contact portions 222 of the spring contact portions 22 of the pair of second contact springs 2B, which are opposed to each other, come into contact with each other in the element insertion hole 31.

In this state, the extension portion 24 of each of the spring contact portions 22 of the pair of the contact springs 2A and each of the spring contact portions 22 of the pair of the contact springs 2B is disposed in each of the flex guide grooves 34A, 34B, and 34A.

In addition, parts of the spring body portion 21 and each of the spring contact portions 22 in the contact springs 2A, 2B, and 2A are disposed in the spring guide grooves 32. Each of the spring contact portions 22 of the pairs of contact springs 2A and each of the spring contact portions 22 of the pair of contact springs 2B receives some kind of external force. Such external force flexes the end portion of the spring body portion 21 which serves as a starting point. During such a flexing operation, the extension portion 24 of the spring contact portion 22 is largely displaced in the forming direction (contact direction Y) of the flex guide grooves 34A, 34B, and 34A, while being displaced only slightly in the depth direction (insertion direction X) of the flex guide grooves 34A, 34B, and 34A.

Therefore, even when an external force is unintentionally applied to each of the spring contact portions 22 of pairs of contact springs 2A and each of the spring contact portions 22 of pair of contact springs 2B, it is possible to prevent the extension portion 24 of the spring contact portion 22 from being displaced from the flex guide grooves 34A, 34B, and 34A. In addition, since each of the spring contact portions 22 of pairs of contact springs 2A and each of the spring contact portions 22 of pair of contact springs 2B are guided by the spring guide groove 32 and the flex guide grooves 34A, 34B, and 34A, the spring contact portions 22 can be prevented from being displaced in the width direction W and passing in the width direction W without being opposed to the contact direction Y.

In addition, as the number of electrodes in the sensor element 11 increases, the number of contact springs 2A, 2B, and 2A also needs to be increased. In the sensor element 11 of the present embodiment, four contact springs 2A, 2B, and 2A are required corresponding to the electrode terminal portions 112 connected to the four electrodes, and two contact springs 2A, 2B, and 2A are required corresponding to the electrode terminal portions 112 connected to respective ends of the heating element of the heater. Furthermore, in the insulator 3, when the number of the contact springs 2A, 2B, and 2A arranged is increased to six or more, the interval in the width direction W in which the contact springs 2A, 2B, and 2A are arranged, that is, the interval in the width direction W in which the spring guide groove 32 is formed must be reduced. In addition, the width W2 of the contact springs 2A, 2B, and 2A in the width direction W has to be reduced.

When the width W2 of the contact springs 2A, 2B, and 2A in the width direction W becomes small, the rigidity of the contact springs 2A, 2B, and 2A decreases, and the contact springs 2A, 2B, and 2A easily swing in the width direction W. In the insulator 3 before the sensor element 11 is inserted, the possibility that each of the spring contact portions 22 of pairs of contact springs 2A and each of the spring contact portions 22 of pair of contact springs 2B swing in the width direction W and the spring contact portions 22, which come in contact each other, pass oppositely to each other in the width direction W increases.

Therefore, in the insulator 3 of the present embodiment, not only each of the spring contact portions 22 of the pairs of contact springs 2A and each of the spring contact portions 22 of the pair of contact springs 2B are guided by the spring guide grooves 32, but also the extension portions 24 of each of the spring contact portions 22 of contact springs 2A, 2B, and 2A are guided by the flex guide grooves 34A, 34B, and 34A. The existence of the flex guide grooves 34A, 34B, and 34A makes it possible to stably guide the elastic deformation of the contact springs 2A, 2B, and 2A whose rigidity is lowered by reducing the width W2.

(When the Sensor Element 11 is Inserted)

As shown in FIGS. 3 and 4, when the sensor element 11 is inserted into the element insertion hole 31 of the insulator 3, each of the spring contact portions 22 of the pairs of contact springs 2A and each of the spring contact portions 22 of the pair of contact springs 2B are guided by each of the spring guide grooves 32, and each of the extension portions 24 of each of the spring contact portions 22 of the contact springs 2A, 2B, and 2A are guided by each of the flex guide grooves 34A, 34B, and 34A. Furthermore, when each of the spring contact portions 22 of pairs of contact springs 2A and each of the spring contact portions 22 of the pair of contact springs 2B are flexed by being pushed by the sensor element 11, in particular, the extension portions 24 of each of the spring contact portions 22 are guided by each of the flex guide grooves 34A, 34B, and 34A, whereby the posture of each of the spring contact portions 22 is stabilized and each of the spring contact portions 22 can be stably flexed.

If each contact spring 2A, 2B, and 2A is guided only by a spring guide groove 32, then when the sensor element 11 comes in contact with the spring contact portion 22, the spring contact 22 is liable to collapse in the width direction W or twist around the central axis of the spring contact 22. When the extension portion 24 of the spring contact portion 22 is guided only by the spring guide groove 32, the position at which the extension portion 24 of the spring contact portion 22 can be arranged is limited. More specifically, if the flex guide grooves 34A, 34B, and 34A do not exist, the extension portion 24 of the spring contact portion 22 cannot be disposed on the base-end side X2 of the element insertion hole 31 in the state before the sensor element 11 is inserted into the element insertion hole 31 of the insulator 3.

In the gas sensor 1 of the present embodiment, by forming the flex guide grooves 34A, 34B, and 34A in the insulator 3, the restriction on the position at which the extension portion 24 of the spring contact portion 22 can be arranged is alleviated. As a result, the posture when each spring contact portion 22 is bent (elastically deformed) is stabilized, and the contact state between the electrode terminal portion 112 and each spring contact portion 22 in the sensor element 11 can be stabilized.

As described above, according to the gas sensor 1 of the present embodiment, the contact state between the electrode terminal portion 112 of the sensor element 11 and each of the spring contact portions 22 of pairs of contact springs 2A and each of the spring contact portions 22 of the pair of contact springs 2B can be stabilized.

Second Embodiment

Figure 8:
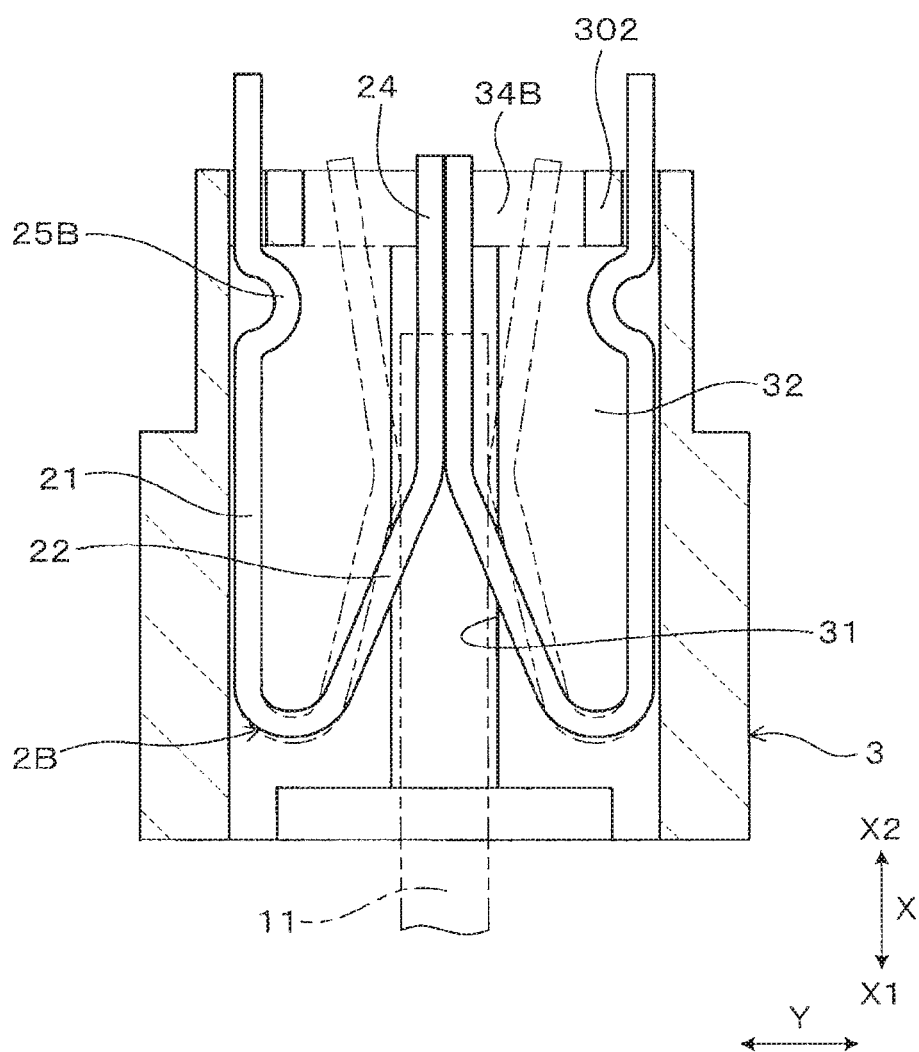
FIG. 8 is a cross-sectional view taken along line IV-IV of FIG. 2, which indicates the status of the flex guide groove according to a second embodiment.

The present embodiment shows other embodiments of the flex guide grooves 34A, 34B, and 34A. In the present embodiment, the second contact spring 2B and the flex guide groove 34B are shown for convenience, but the same applies to the first contact spring 2A and the flex guide groove 34A. For example, as shown in FIG. 8, the flex guide groove 34B may be formed as a through groove, that is, a perforation, that penetrates the bottom wall portion 302 of the insulator 3. In this case, the extension portion 24 of the contact spring 2B may be disposed so as to penetrate the flex guide groove 34B as the through groove, and the end surface 241 of the extension portion 24 may be disposed more on the base-end side X2 than the bottom wall portion 302.

Figure 9:
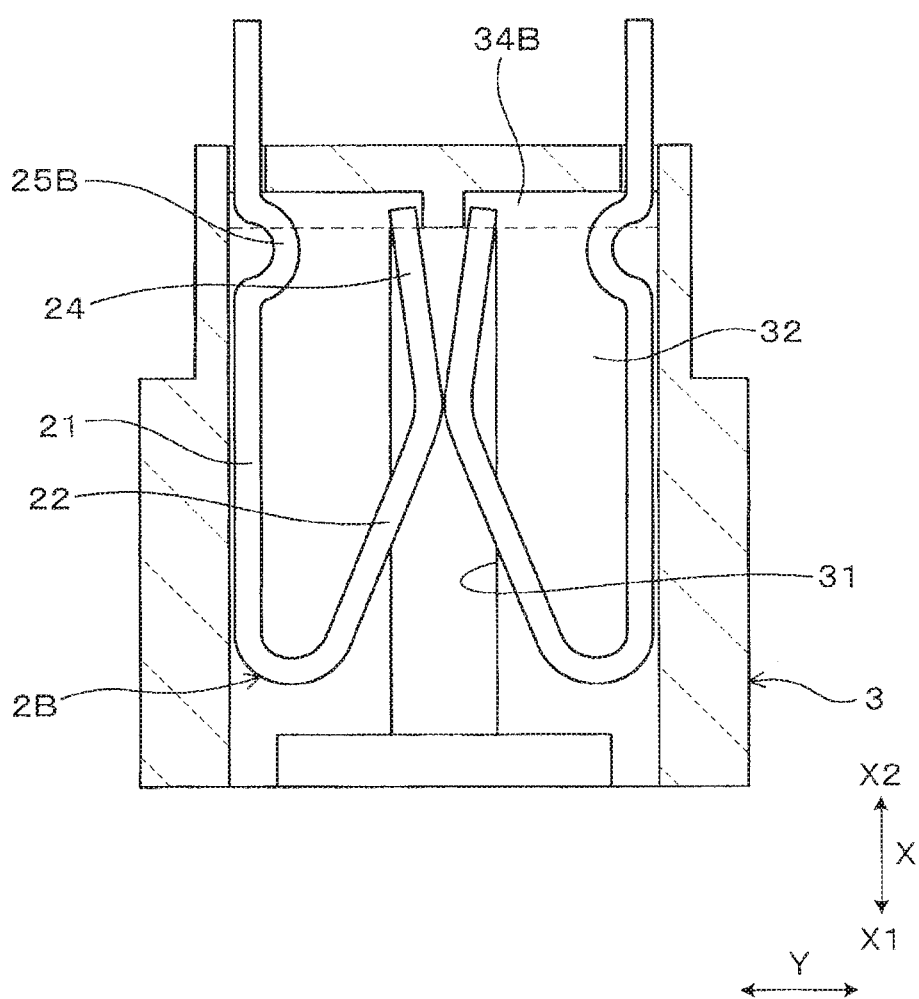
FIG. 9 is a cross-sectional view taken along line IV-IV of FIG. 2, which indicates the status of an alternative guide groove according to the second embodiment.
Figure 10:
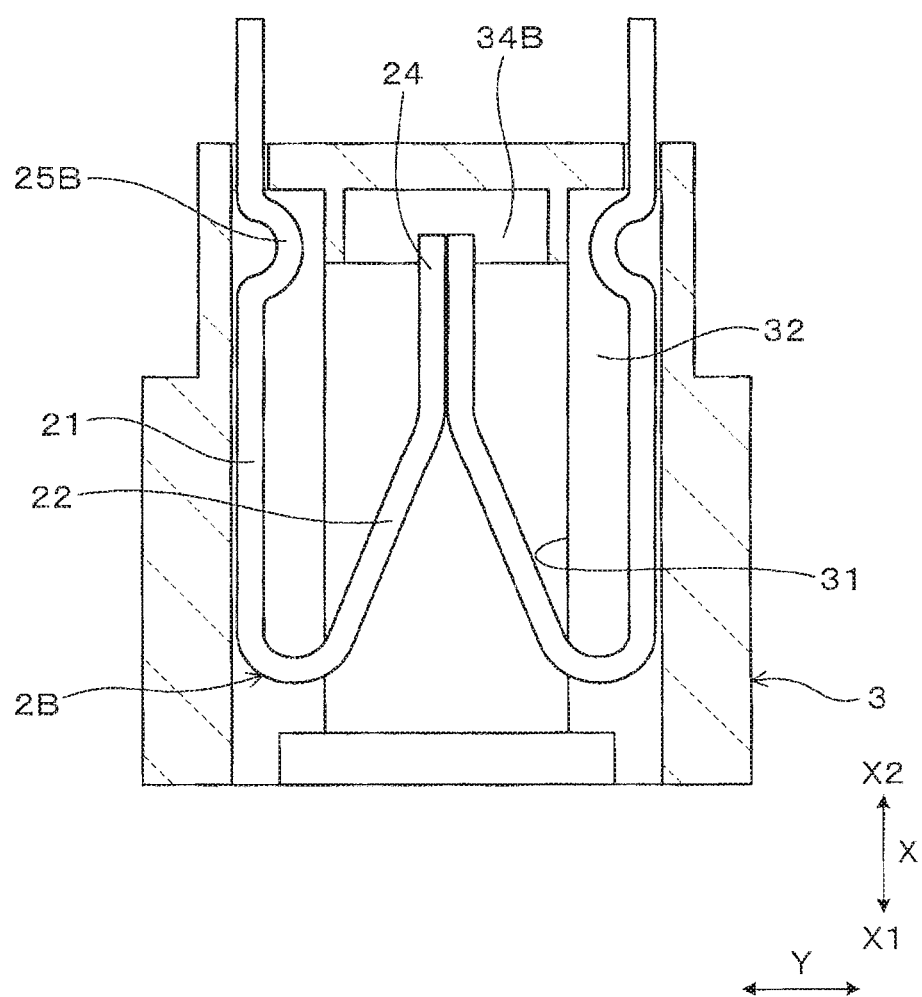
FIG. 10 is a cross-sectional view taken along line IV-IV of FIG. 2, which indicates the status of an alternative flex guide groove according to the second embodiment.

Further, as shown in FIG. 9, the flex guide groove 34B may be formed to separately guide the extension portions 24 of the pair of spring contact portions 22 which are opposed to each other. In this case, the flex guide groove 34B is formed by dividing at an intermediate position in the contact direction Y. As shown in FIG. 10, the flex guide groove 34B may also be formed independently of the spring guide groove 32 located on both sides of the contact direction Y. In addition, a portion bent in a curved shape may be formed at the tip-end portion of the extension portion 24 of the spring contact portion 22.

The present disclosure is not limited to only the embodiments, and can be applied to further different embodiments without departing from the spirit thereof. The scope of the present disclosure should encompass various modifications or equivalents.

What is claimed is:

1. A gas sensor comprising:
a pair of contact springs, each of the paired contact springs having a spring body portion and a spring contact portion which extends from an end portion of the spring body portion, and faces the spring body portion, and is flexible to come in contact with a sensor element, for measuring a concentration of gas;
an insulator having an element insertion hole into which the sensor element is inserted and a pair of spring guide grooves communicating with the element insertion hole formed along a forming direction of the element insertion hole, and guides and holds a spring main body of the pair of contact springs, respectively, wherein:
the spring contact portions of the pair of the contact springs are disposed at positions which are opposed to each other with the sensor element interposed therebetween;
the pair of spring guide grooves are disposed at positions which are opposed to each other with the element insertion hole interposed therebetween; and
the insulator of the gas sensor has a flex guide groove formed to guide the spring contact portion in a direction orthogonal to a direction in which the pair of spring guide grooves are opposed to each other, wherein:
the sensor element has a tip end and a base end opposed to each other in an insertion direction, the base end of the sensor element being disposed closer to a base-end side than the tip end of the sensor element is;
the insulator has a bottom wall portion facing and being spaced apart from the base end of the sensor element;
the flex guide groove is formed in the bottom wall portion, and is formed in a direction to guide the spring contact portions orthogonal to the direction in which the pair of spring guide grooves are opposed to each other;
a base end of each of the spring contact portions is closer to the bottom wall portion than the base end of the sensor element;
a tip-end portion of an extension portion of each of the spring contact portions is disposed in the flex guide groove; and
the spring contact portions are disposed in the respective spring guide grooves, except for the tip-end portion of the extension portion of each of the spring contact portions.

2. The gas sensor according to claim 1, wherein the flex guide grooves are configured to communicate with the pair of spring guide grooves which are opposed to each other and collectively guide extension portions of the pair of spring contact portions which are opposed to each other.

3. The gas sensor according to claim 1, wherein, when the direction in which the sensor element is inserted into the element insertion hole is referred to as the insertion direction and an open side of the element insertion hole is referred to as a tip-end side in the insertion direction, and the side opposite to the tip-end side is referred to as the base-end side, the flex guide grooves are formed to include a portion positionally adjacent to the base-end side of the element insertion hole.

4. The gas sensor according to claim 3, wherein the sensor element is held to be sandwiched between the pair of the spring contact portions which are opposed to each other in a state of being inserted into the element insertion hole, and extension portions of the pair of spring contact portions are provided within the flex guide groove at a position closer to the base-end side than the sensor element is.

5. The gas sensor according to claim 4, wherein each of the pair of spring contract portions has a contact portion in contact with the sensor element and the extension portion is formed linearly from the contact portion, and the extension portion has an end surface arranged within the flex guide groove.

6. The gas sensor according to claim 5, wherein a gap is formed between the end surface of the extension portion and a bottom surface of the flex guide groove.

7. The gas sensor according to claim 6, wherein a width of the flex guide groove has a width which is within a range of more than a value of a 1-fold of a width of the extension portion of each of the pair of spring contract portions, to a value less than 2-folds of the width of the extension portion of the each of the pair of spring contract portions.

8. The gas sensor according to claim 7, wherein the width of the flex guide groove is within a range from the value which is more than 1-fold of the width of the extension portion, to a value which is less than 1.5-fold of the width of the extension portion.

9. The gas sensor according to claim 2, wherein, when the direction in which the sensor element is inserted into the element insertion hole is referred to as the insertion direction and an open side of the element insertion hole is referred to as a tip-end side in the insertion direction, and the side opposite to the tip-end side is referred to as the base-end side, the flex guide grooves are formed to include a portion positionally adjacent to the base-end side of the element insertion hole.

10. The gas sensor according to claim 9, wherein the sensor element is held to be sandwiched between the pair of spring contract portions which are opposed to each other in a state of being inserted into the element insertion hole, and the extension portions of the pair of spring contact portions are provided within the flex guide groove at a position closer to the base-end side than the sensor element is.

11. The gas sensor according to claim 10, wherein each of the pair of spring contract portions has a contact portion in contact with the sensor element and the extension portion is formed linearly from the contact portion, and the extension portion has an end surface arranged within the flex guide groove.

12. The gas sensor according to claim 11, wherein a gap is formed between the end surface of the extension portion and a bottom surface of the flex guide groove.

13. The gas sensor according to claim 12, wherein a width of the flex guide groove has a width which is within a range of more than a value of a 1-fold of a width of the extension portion of the spring contact portion, to a value less than 2-folds of the width of the extension portion of the spring contact portion.

14. The gas sensor according to claim 13, wherein the width of the flex guide groove is within a range from the value which is more than 1-fold of the width of the extension portion, to a value which is less than 1.5-fold of the width of the extension portion.

15. The gas sensor according to claim 1, wherein a width of the flex guide groove has a width which is within a range of more than a value of a 1-fold of a width of an extension portion of each of the pair of spring contract portions to a value less than 2-folds of the width of the extension portion of each of the pair of spring contract portions.

16. The gas sensor according to claim 15, wherein the width of the flex guide groove is within a range from the value which is more than 1-fold of the width of the extension portion, to a value which is less than 1.5-fold of the width of the extension portion.

17. The gas sensor according to claim 2, wherein a width of the flex guide groove has a width which is within a range of more than a value of a 1-fold of a width of the extension portion of each of the pair of spring contract portions, to a value less than 2-folds of the width of the extension portion each of the pair of spring contract portions.

18. The gas sensor according to claim 17, wherein the width of the flex guide groove is within a range from the value which is more than 1-fold of the width of the extension portion, to a value which is less than 1.5-fold of the width of the extension portion.

19. The gas sensor according to claim 1, wherein the flex guide groove, which guides each of the pair of spring contract portions, is positioned between the base end of the sensor element and a bottom surface of the flex guide groove.

20. The gas sensor according to claim 19, wherein each of the pair of spring contract portions has a contact portion in contact with the sensor element and an extension portion is formed linearly from the contact portion, and the extension portion has an end surface arranged and movable within the flex guide groove positioned between the base end of the sensor element and the bottom surface of the flex guide groove.

21. The gas sensor according to claim 1, wherein:
   each of the pair of spring contact portions has an extension portion with a tip-end portion;
   the flex guide groove of the bottom wall portion has a base surface; and
   the base surface of the flex guide groove is arranged to face the tip-end portion of the extension portion of each of the pair of spring contact portions.

* * * * *